(12) United States Patent
Aberg (10) Patent No.: US 10,286,474 B2
(45) Date of Patent: May 14, 2019

(54) METHOD OF AUTOMATICALLY SETTING A WELDING PARAMETER FOR MIG/MAG WELDING AND A CONTROLLER FOR PERFORMING THE METHOD

(75) Inventor: Per Aberg, Laxa (SE)

(73) Assignee: ESAB AB, Gothenburg (SE)

( * ) Notice: Subject to any disclaimer, the term of this patent is extended or adjusted under 35 U.S.C. 154(b) by 629 days.

(21) Appl. No.: 13/702,932

(22) PCT Filed: Jun. 14, 2010

(86) PCT No.: PCT/EP2010/058314
§ 371 (c)(1),
(2), (4) Date: Feb. 26, 2013

(87) PCT Pub. No.: WO2011/157286
PCT Pub. Date: Dec. 22, 2011

(65) Prior Publication Data
US 2013/0161302 A1 Jun. 27, 2013

(51) Int. Cl.
*B23K 9/10* (2006.01)
*B23K 9/095* (2006.01)
*B23K 9/12* (2006.01)

(52) U.S. Cl.
CPC ............ *B23K 9/095* (2013.01); *B23K 9/0953* (2013.01); *B23K 9/124* (2013.01)

(58) Field of Classification Search
CPC ....... B23K 9/095; B23K 9/0953; B23K 9/124
USPC .............. 219/130.01, 124.02, 125.1, 130.31, 219/137 R, 130.33, 137.71, 130.32, 61.2, 219/61.5, 130.1, 130.21; 361/42, 47, 48, 361/49, 50
See application file for complete search history.

(56) References Cited

U.S. PATENT DOCUMENTS

| | | | | | |
|---|---|---|---|---|---|
| 2,897,343 | A | * | 7/1959 | Regnauld | B23K 9/1037 219/130.21 |
| 3,743,812 | A | * | 7/1973 | Peyrot | B23K 9/0286 219/137.7 |
| 3,851,137 | A | * | 11/1974 | Verhagen | B23K 9/125 219/130.21 |
| 4,546,227 | A | * | 10/1985 | Gamo | B23H 7/065 219/69.12 |

(Continued)

FOREIGN PATENT DOCUMENTS

| | | |
|---|---|---|
| CN | 101296773 A | 10/2008 |
| EP | 1559496 A1 | 8/2005 |

(Continued)

OTHER PUBLICATIONS

Modeling MIG welding using statistical approaches.*

(Continued)

*Primary Examiner* — Dana Ross
*Assistant Examiner* — Ket D Dang
(74) *Attorney, Agent, or Firm* — Edell, Sharpiro & Finnan, LLC (57) ABSTRACT

A method of automatically setting a welding parameter for MIG/MAG welding is disclosed. The method includes initiating a parameter setting welding operation; measuring a welding voltage and retrieving a parameter representing a wire feed speed during the parameter setting welding operation; and identifying a second function mapping the welding current to the welding voltage from the measured welding voltage and the retrieved parameter.

16 Claims, 4 Drawing Sheets

(56) References Cited

U.S. PATENT DOCUMENTS

| | | | |
|---|---|---|---|
| 5,003,147 A * | 3/1991 | Kawanabe | B23H 7/06 219/69.12 |
| 5,528,013 A | 6/1996 | Kaihori et al. | |
| 5,767,500 A * | 6/1998 | Cordes | G06K 7/1098 235/462.47 |
| 6,091,048 A * | 7/2000 | Lanouette et al. | 219/130.21 |
| 6,563,085 B2 * | 5/2003 | Lanouette et al. | 219/130.5 |
| 6,642,483 B1 * | 11/2003 | Koga | B23K 9/0953 219/130.01 |
| 2003/0062352 A1 * | 4/2003 | Kislovsky | B23K 9/04 219/130.21 |
| 2004/0011775 A1 * | 1/2004 | Hackl | B23K 9/1087 219/124.34 |
| 2004/0173591 A1 | 9/2004 | Knoener | |
| 2005/0161448 A1 * | 7/2005 | Stava et al. | 219/130.21 |
| 2006/0131291 A1 * | 6/2006 | Kaufman | B23K 9/09 219/130.5 |
| 2006/0196862 A1 * | 9/2006 | Sickels | B23K 9/12 219/130.5 |
| 2008/0142493 A1 * | 6/2008 | Uecker | B23K 9/125 219/130.4 |
| 2008/0156781 A1 | 7/2008 | Artelsmair et al. | |
| 2009/0026188 A1 * | 1/2009 | Schorghuber | B23K 9/124 219/137 PS |
| 2009/0277893 A1 | 11/2009 | Speilman | |

FOREIGN PATENT DOCUMENTS

| | | | |
|---|---|---|---|
| JP | 56-017192 B | | 2/1981 |
| JP | 58110179 A | * | 6/1983 |
| JP | 06-297146 A | | 10/1994 |
| JP | 2003-230958 A | | 8/2003 |
| JP | 2009-507646 A | | 2/2009 |
| KR | 20090026324 A | | 3/2009 |
| KR | 20130143480 A | | 12/2013 |
| WO | WO 2007032734 A1 | * | 3/2007 |

OTHER PUBLICATIONS

Notification of the First Office Action from the State Intellectual Property Office of the People's Republic of China for Application No. 201080067419.9 dated Jun. 24, 2014 with translation, 16 pages.
Patent Examination Report No. 1 from Australian Government/IP Australia for Patent Application No. 2015200012 dated Jan. 6, 2016, 3 pages.
Patent Examination Report No. 1 from Australian Government/IP Australia for Patent Application No. 2010355561 dated Sep. 1, 2014, 3 pages.
Intellectual Property of India Examination Report for Application No. 10835/DELNP/2012 dated Jul. 20, 2018 with translation, 7 pages.
International Preliminary Report on Patentability and Written Opinion for International Application No. PCT/EP2010/058314 dated Dec. 14, 2012, 6 pages.
International Search Report for International Application No. PCT/EP2010/058314 dated May 11, 2011, 3 pages.
Notification of Reasons for Refusal for Japanese Patent Application No. 2013-514557 with translation dated Feb. 7, 2014, 3 pages.
Korean Intellectual Property Office Notification of Reason for Refusal for Application No. 10-2012-7032474 with translation dated Nov. 16, 2015, 4 pages.
Korean Intellectual Property Office Written Opinion for Application No. 10-2012-7032474 with translation dated Nov. 16, 2015, 3 pages.

* cited by examiner

METHOD OF AUTOMATICALLY SETTING A WELDING PARAMETER FOR MIG/MAG WELDING AND A CONTROLLER FOR PERFORMING THE METHOD

FIELD OF INVENTION

The invention relates to a method of automatically setting a welding parameter for MIG/MAG welding. The invention furthermore relates to a welding method which is subdivided into a parameter setting welding operation where a welding test is performed in order to derive a welding parameter and a subsequent welding operation which is based on the welding parameter derived during the parameter setting welding operation. The invention also relates to a controller arranged for performing the method.

BACKGROUND OF THE INVENTION

MIG/MAG-welding is a welding process where an electrode is continuously fed toward a working piece. An electric power source generates a welding voltage and a welding current. During the welding process, the workpiece is heated primarily by an arc generated by the power source. The electrode is heated, partly by the power developed in the electrode as the weld current flows through an electrode stick out, and partly by the heat developed by the arc itself. The electrode stick out is a part of the welding wire between a free wire end and a contact tip, where the current transfer to the electrode takes place. A basic control of the welding process aims at achieving an electrode melting speed which corresponds to the electrode feed speed. Another basic control of the welding process is to enable the welding process to operate in a desired metal transfer mode. Further objects of the control may for instance be to influence the amount of heat transferred to the workpiece.

Figure 2:
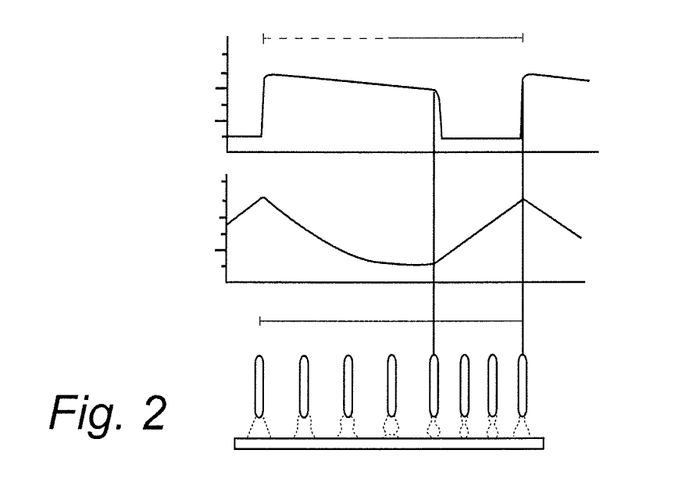

MIG/MAG-welding takes place in one of three basic metal transfer modes. In short arc welding, the material transport from the electrode to the workpiece takes place through short-circuiting droplets. A short arc welding process is schematically disclosed in FIG. 2. Since the process consists in alternating arc and short-circuiting droplet transitions, the average voltage between the electrode and the workpiece becomes low and thus the heat transfer to the base material will remain moderate.

When the supplied power is increased, one passes into the mixed arc area, where the material transport takes place through a mixture of short-circuiting and non-short-circuiting droplets. The result is an unstable arc which is difficult to control with a risk for much weld spatter and weld smoke. Welding in this area is normally avoided.

At a sufficiently high supplied power, the process enters the spray area, where the material transport takes place through small finely dispersed droplets without short circuits. The spatter quantity is clearly lower than in short arc welding. The heat supply to the base material will here be greater and the method is suitable primarily for thicker workpieces.

In the spray area pulsed welding is possible by use of an advanced controller controlling the power source. In pulsed welding the controller controls the wave shape of the welding current to ensure proper pinch off of the droplets one by one. Each pulse detaches a droplet and the droplets become sufficiently small not to short-circuit. This method results in advantages from the spray area in form of low weld spatter without the disadvantages of the large heat transfer.

A welding power supply may be described by its static and dynamic characteristics. The static characteristics of a power source describes how the output voltage is dependent on the output current with constant load conditions. The dynamic characteristics of a power source describes how the output voltage is dependent on the output current under varying load conditions.

The static characteristic of a welding energy source is frequently represented in a static voltage-current diagram (U-I diagram). The dynamic characteristic may be represented in diagrams of voltage against time and current against time or as voltage against current evaluated in time as working point movements.

Both static and dynamic characteristics of a welding energy source affect the welding process. As a result of the mutual interference between the static and dynamic characteristics optimization of the process is difficult.

Static characteristics of a power supply in a welding machine must be adapted to which metal transfer mode is selected for the welding process. A MIG/MAG-machine adapted for short arc welding is to be considered as a constant voltage source having a slightly decreasing characteristic, normally 3V per 100 A. This can be compared to a TIG welding machine where instead the current is constant.

In less sophisticated welding machines there is a setting knob for the electrode feed speed and a setting knob for the choice of one of several voltage outlets from the weld transformer in the welding machine. This may be replaced by a wheel for controlling the ignition angle on a thyristor for generating the weld voltage. In modern inverter machines, the weld voltage may be controlled with great precision. Modern inverter technology with switch mode power supply and micro processor controlled transistors offers faster and more precise control of both the static and the dynamic characteristics compared to other power supply configurations with thyristors or step controlled transformers that need to be adapted for each welding method and welding case.

To select a suitable reference value for the voltage for a particular electrode speed may be difficult for a welding operator, since an appropriate reference value is dependent on such factors as electrode material, electrode dimension and shielding gas type. In welding machines of today it is usual to include experience in form of suitable welding parameters for various electrode feed speeds for varying combinations of values of the influencing factors mentioned above, so called synergy lines, in the control computer of the welding machine. Producing such lines for all combinations of influencing factors represents an extensive work in the form of test weldings and documentation. In addition, the electrode quality may vary between different deliveries and thus lead to that previously tested synergy lines do not function any longer. Furthermore, shielding gases are now marketed with supplier specific names without specifying the composition of the gas. This also leads to problems in having a predetermined quantity of synergy lines suitable for all weld cases. Not even a later repetition of an apparently identical weld case is always successful since the composition of the gas or the weld electrode may have been changed by the manufacturer without notice. Obviously, this leads to a troublesome uncertainty when welding a new batch.

DISCLOSURE OF THE INVENTION

It is an object of the invention to facilitate welding of different weld cases by reducing the number of factors that must be accounted for when initiating a welding process.

This object is achieved by a method of automatically setting a welding parameter for MIG/MAG welding.

According to the invention a welding voltage and a parameter representing the wire feed speed are measured during the parameter setting welding operation. The welding voltage may be detected by forming an average over a number of welding cycles. The average may be formed on a segment of the welding period or alternatively cover the complete welding period. The segment may be formed of a period with a base current or of a period of a peak current, or alternatively parts of both the base period and the peak period. For the purpose of the invention, it is sufficient that the detected voltage is representative of the welding process.

The parameter representing the wire feed speed may be actual the wire feed speed, or alternatively the welding current. The welding controller use the measured welding voltage and welding current to identify a second function mapping said parameter representing the wire feed speed to said welding voltage.

The second function is identified by the welding controller in a second function identification control block from the welding voltage and the parameter representing the wire feed speed. A second data couple defines an operating point in a welding voltage/wire feed speed space. A set of second data couples defines a set of operating points in the welding voltage/wire feed speed space. Functions defining a relationship between welding voltage and said parameter representing the wire feed speed between wires of different materials may be stored in a memory accessible by said second function identification control block. By identification of the operating point in the welding voltage/wire feed speed space, or by linear regression of the set of operating points, a function which best represents a current welding operation may be selected. In one embodiment the material used in the welding wire is determined from data representing the welding voltage at zero wire feed speed. It has been shown that different materials and different thicknesses of the welding wire materials are described with different functions in the welding voltage/wire feed speed space and that these functions are easily separable at zero or approximately zero wire feed speed. It should here be noted that the second function may be retrieved by collecting data couples defining a set of operating points in the welding voltage/wire feed speed space. The data couples are collected at real welding operating points. A second function describing a relationship between the welding voltage and wire feed speed may be identified. This function will be defined outside of real welding operating points, such as welding at zero wire feed speed. Hence, even though welding may not be performed at zero wire feed speed, the value of the second function, at zero wire feed speed may be used to separate categories of material from each other. The second function may for instance be a least square adaptation of a function to a set of data couples.

The welding controller may thus automatically determine which welding wire material category is presently used from the identified second function in welding wire determination control block. Examples of welding wire material categories are low alloyed steel, high alloyed steel and aluminium alloys. The determination of welding wire material category may be performed as suggested above by retrieving a value of a welding voltage at zero wire feed sped from the second function, by use of a look up table which defines a material or a class of welding materials depending on the value of the second function or by matching the second data couple or couples to a second function, which itself is representative of a specific material.

Generally the second function $\phi$ forms a linear mapping from the parameter representing the wire feed speed to the welding voltage, $U=\phi(v)$. Suitably the relationship between the welding current and the welding voltage may be expressed as $U=\varphi*v$, even though more complex functions may be contemplated. Here U is the welding voltage and v is the parameter representing the wire feed speed. With the parameter value representing the wire feed speed and the welding voltage, the second function $\phi$ may be represented by a parameter value $\varphi$ that may be determined by a straightforward operation in the welding controller. The second function is thus mapping the welding current to the welding voltage for a specific category of material. The mapping can be established by recording data collected in tests of various welding wire material and welding wire thicknesses at various welding conditions for different welding voltage and wire feed speed. Since the tests are dependent on that an appropriate welding voltage is applied for a specific welding current, the determination of which welding wire material is currently used may be done together with an automatic setting of the welding voltage by regulating the reference voltage with respect to the short arc percentage value. The combined method enables a welding machine to be operable for a large variety of weld electrode dimensions and materials.

The need of tested synergy lines for different electrode material, electrode dimension and shielding gas type will to a large extent not be needed any longer, and thus the security of a proper repetition accuracy during welding with wires and gases from different suppliers and from different manufacturing batches is increased.

Once the welding wire material and welding wire dimension has been accounted for by setting of an appropriate wire feed speed and a desired welding current a globular area transition current may be determined for the welding wire. The globular area transition current is a current which is representative of the globular area. The globular area is where metal transfer mode shifts from short circuiting to spray or vice versa. The appropriate wire feed speed and welding current for a selected but undefined welding wire material and dimension may be automatically determined in accordance with what has been described above from the first and second functions.

Optionally the method of automatically setting a welding parameter for MIG/MAG welding begins with a step of initiating a parameter setting welding operation. In the parameter setting welding operation data is collected for subsequent use in a continued welding operation. The parameter setting welding operation may be performed on a test piece of for instance scrap metal. The parameter setting welding operation is performed at a selected wire speed with a wire having a wire dimension that may be unknown. During the parameter setting welding operation an operator initiates a welding process and continues for a period of time extending from a few seconds to typically less than a minute. During this time a controlling voltage of the welding process is adapted to a present wire material, gas and wire feed combination. The adaptation of the controlling voltage is performed to select a controlling voltage providing stable welding conditions with a good repeatability of the short circuit condition over a plurality of welding cycles.

The selection may be performed by varying the controlling voltage and recording a measure on the stability of the welding process, where after a controlling voltage with a good stability is selected. A parameter setting reference voltage may be selected by the operator, or as in an embodiment of the invention automatically determined in the parameter setting welding operation. The automatic determination of an appropriate controlling voltage may be performed by controlling a short circuiting percentage to achieve a desired set value for the reference voltage in a manner as explained in WO2007/032734. After an initial stabilizing period where a controlling voltage is selected data may be collected at the parameter setting welding operation. The initial stabilizing period typically extends for a few seconds.

According to the invention a response welding current at a present wire feed speed is detected during said parameter setting welding operation. The response welding current may be provided from the welding controller, which is provided with a sensor for sensing the welding current. The response welding current may be detected by forming an average over a number of welding cycles. The average may be formed on a segment of the welding period or alternatively cover the complete welding period. The segment may be formed of a period with a base current or of a period of a peak current, or alternatively parts of both the base period and the peak period. For the purpose of the invention, it is sufficient that the detected current is representative of the welding process.

The wire feed speed may be obtained from a welding controller at which the wire feed speed has been set by an operator or by a controller determining a suitable wire feed speed or from a sensor sensing the wire feed speed.

The detected response welding current and present wire feed speed may be collected as a data couple or as a set of data couples.

A first function $\psi$ is identified by the welding controller in a first function identification control block from the detected response welding current and the present wire feed speed. A data couple defines an operating point in a welding current/wire feed speed space. A set of data couples defines a set of operating points in the welding current/wire feed speed space. Functions defining a relationship between welding current and wire feed speed between wires of different dimensions may be stored in a memory accessible by said first function identification control block. By identification of the operating point in the welding current/wire feed speed space, or by linear regression of the set of operating points, a function which best represents a current welding operation may be selected. Each function represents a specific welding case for a welding wire material and thickness. The set of functions are determined by experiments, to collect data describing the relationship between welding current and wire feed speed for different materials and different wire thicknesses. The results are stored in the memory of the controller as a set of first functions.

The determination of the first function may be performed by interpolating in a look up table defining relationships between the welding current and the wire feed speed for a set of welding conditions, by using a function defining a relationship between the welding current and the wire feed speed for a set of welding conditions, wherein a first function is selected by selecting appropriate parameter values for the stored function or by any means for identifying a selected relationship between the welding current and the wire feed speed in a set of stored relationships between welding current and wire feed speed for different operating conditions.

Generally the first function $\psi$ forms a linear mapping from the response welding current to the present wire feed speed. Suitably the relationship between the welding current and the wire feed speed may be expressed as $v=k*I^p$, even though more or less complex functions may be contemplated. Here v is the wire feed speed, I is the welding current and p is a number between 1 and 2. This relationship may hold for a set of welding wires with different dimensions and of different materials. The appropriate function for a specific material and dimension is characterised by the values on k and p. With the detected response welding current and the current wire feed speed, the first parameter values k and p may be determined by a straightforward operation in the welding controller.

Furthermore a desired wire feed speed is determined by the welding controller from the first function and a desired welding current. This is performed by the welding controller in a wire feed speed control block which determines a wire feed speed from the first function and the desired welding current. The determination of the desired wire feed speed may be performed by taking the desired welding current as input data and interpolating in a look up table defining the first function, by using a function defining first function or by any other means for defining the first function, using the desired welding current as indata. The desired welding current may be selected by the operator or be determined by the controller.

Optionally the desired welding current may be determined as follows. An operator may set an actual thickness of a work piece to be welded as an input data to the welding controller. The welding controller includes a desired welding current mapping function, which maps a thickness of the work piece to a desired welding current. The desired welding current mapping function may be provided in the form of a look up table defining a relationship between the work piece thickness and the desired welding current, by using a function defining a relationship between the work piece thickness and the desired welding current or by any other means for defining a relationship the work piece thickness and the desired welding current. The look up table and/or the function may be generated by collection of welding data in a conventional manner. A desired welding current is determined by the welding controller by use of the desired welding current mapping function.

Generally the desired welding current mapping function forms a linear mapping from the work piece thickness to the desired welding current. The desired welding current may additionally depend on the material of the working piece. The material of the welding piece may be entered into the controller by the operator, or alternatively automatically determined by the controller in a manner disclosed below. Suitably the relationship between the work piece thickness and the desired welding current may be expressed as $I=k_1*T+k_2*T^2$, even though more complex functions may be contemplated. Here I is the welding current and T is the thickness of the working piece. The parameters $k_1$ and $k_2$ may be dependent of the material of the work piece. By inputting data representing the thickness of the welding piece, the desired welding current may be determined.

By use of the method of automatically setting a welding parameter for MIG/MAG welding according to the invention, the need for setting a wire feed speed manually or by use of complex synergy lines reflecting the complete welding case is obviated and replaced by an automatic setting of the wire feed speed determined from a desired welding current. Optionally the desired welding current is automatically determined from an input from an operator selecting a thickness of the working piece. The complexity of setting welding conditions is thereby reduced.

A stable parameter setting welding operation may be established by operating the MIG/MAG welding equipment in the short arc metal transfer mode during the parameter setting welding operation.

In the short arc metal transfer mode the state at the electrode alternates between short-circuiting and arc between the weld wire end (electrode end) and the workpiece. The dynamic properties of the weld current source determine the time of the short-circuiting. During normal welding each short circuit ought to be 0.5-40 milliseconds. Appropriate dynamic properties are created by properly dimensioning the inner resistance in the weld transformer, inductor and electronic circuits, and the inductance of the inductor, in a manner known for a person skilled in the art. In modern machines, the inductor is frequently of an electronic kind, i.e. a process regulator comprising hardware and software. In particular the dynamic properties may be varied at a start process in relation to welding during continuance. The dynamic properties of a welding machine determine how fast the welding current can be controlled and adjusted during the welding process. The process regulator thus gives the properties, which influence each individual short-circuiting process by defining, in the process regulator, the current increasing rate during the short-circuiting. The static characteristic of the machine is mainly defined by said inner resistance or its equivalent in a process regulator.

Optionally the parameter setting welding operation comprises establishment of a short arc welding process defined by a short-circuiting time and an arc time. The welding controller may be set to control the melting efficiency of the electrode in such a way that the melting efficiency is increased if a measured short-circuiting time of a total period time, where the period time is the sum of the short-circuiting time and the arc time, exceeds a defined adjustable set value and decreased if said short-circuiting percentage goes below said set value.

By maintaining the percentage of the short-circuiting time in relation to the period time constant at the desired set value, a good effect on the tolerance of the welding towards different external influencing factors, such as variations in distance between a contact tip and the workpiece is obtained. The period time is the sum of the short-circuiting time and the arc time during a welding cycle.

Optionally a voltage reference value Uref is determined from said short-circuiting percentage value. The voltage reference value Uref is adapted such that the preset short circuit percentage is obtained. Hence, the use of determining a short circuiting percentage value during the parameter setting welding operation enables automatic setting of an appropriate voltage reference value for controlling the welding operation. Furthermore, a tolerance towards different shielding gas compositions is achieved.

Optionally a welding voltage and a parameter representing the wire feed speed are measured during the parameter setting welding operation. The welding voltage may be detected by forming an average over a number of welding cycles. The average may be formed on a segment of the welding period or alternatively cover the complete welding period. The segment may be formed of a period with a base current or of a period of a peak current, or alternatively parts of both the base period and the peak period. For the purpose of the invention, it is sufficient that the detected voltage is representative of the welding process.

The parameter representing the wire feed speed may be actual the wire feed speed, or alternatively the welding current. The welding controller use the measured welding voltage and welding current to identify a second function mapping said parameter representing the wire feed speed to said welding voltage.

The second function is identified by the welding controller in a second function identification control block from the welding voltage and the parameter representing the wire feed speed. A second data couple defines an operating point in a welding voltage/wire feed speed space. A set of second data couples defines a set of operating points in the welding voltage/wire feed speed space. Functions defining a relationship between welding voltage and said parameter representing the wire feed speed between wires of different materials may be stored in a memory accessible by said first function identification control block. By identification of the operating point in the welding voltage/wire feed speed space, or by linear regression of the set of operating points, a function which best represents a current welding operation may be selected. In one embodiment the material used in the welding wire is determined from data representing the welding voltage at zero wire feed speed. It has been shown that different materials and different thicknesses of the welding wire materials are described with different functions in the welding voltage/wire feed speed space and that these functions are easily separable at zero or approximately zero wire feed speed. It should here be noted that the second function may be retrieved by collecting data couples defining a set of operating points in the welding voltage/wire feed speed space. The data couples are collected at real welding operating points. A second function describing a relationship between the welding voltage and wire feed speed may be identified. This function will be defined outside of real welding operating points, such as welding at zero wire feed speed. Hence, even though welding may not be performed at zero wire feed speed, the value of the second function, at zero wire feed speed may be used to separate categories of material from each other. The second function may for instance be a least square adaptation of a function to a set of data couples.

The welding controller may thus automatically determine which welding wire material category is presently used from the identified second function in welding wire determination control block. Examples of welding wire material categories are low alloyed steel, high alloyed steel and aluminium alloys. The determination of welding wire material category may be performed as suggested above by retrieving a value of a welding voltage at zero wire feed sped from the second function, by use of a look up table which defines a material or a class of welding materials depending on the value of the second function or by matching the second data couple or couples to a second function, which itself is representative of a specific material.

Generally the second function $\phi$ forms a linear mapping from the parameter representing the wire feed speed to the welding voltage, $U=\phi(v)$. Suitably the relationship between the welding current and the welding voltage may be expressed as $U=\varphi*v$, even though more complex functions may be contemplated. Here U is the welding voltage and v is the parameter representing the wire feed speed. With the parameter value representing the wire feed speed and the welding voltage, the second function $\phi$ may be represented by a parameter value $\varphi$ that may be determined by a straightforward operation in the welding controller. The second function is thus mapping the welding current to the welding voltage for a specific category of material. The mapping can be established by recording data collected in tests of various welding wire material and welding wire thicknesses at various welding conditions for different welding voltage and wire feed speed. Since the tests are dependent on that an appropriate welding voltage is applied for a specific welding current, the determination of which welding wire material is currently used may be done together with an automatic setting of the welding voltage by regulating the reference voltage with respect to the short arc percentage value. The combined method enables a welding machine to be operable for a large variety of weld electrode dimensions and materials.

The need of tested synergy lines for different electrode material, electrode dimension and shielding gas type will to a large extent not be needed any longer, and thus the security of a proper repetition accuracy during welding with wires and gases from different suppliers and from different manufacturing batches is increased.

Once the welding wire material and welding wire dimension has been accounted for by setting of an appropriate wire feed speed and a desired welding current a globular area transition current may be determined for the welding wire. The globular area transition current is a current which is representative of the globular area. The globular area is where metal transfer mode shifts from short circuiting to spray or vice versa. The appropriate wire feed speed and welding current for a selected but undefined welding wire material and dimension may be automatically determined in accordance with what has been described above from the first and second functions.

The possibility to control the welding process by controlling the reference voltage in dependence of a short arc percentage value enables stable welding at least partly into the spray area. In the colder part of the spray area, a small percentage of short-circuiting droplet transitions is still present. With a setting of 2-5% short-circuiting percentage, a stable control also of this part of the spray area, sometimes mentioned under the concept RapidArc, is obtained. During pure short arc welding, a suitable short-circuiting percentage is, however, 17-25%, and 21% has been shown to be suitable. If a colder weld is desired, the percentage is increased and vice versa. An inputting device having this function to adjust the set value for the short-circuiting percentage should be present on the current source, electrode feeder or adjustment box.

An automatic detection of the welding wire material and welding wire dimension enables automatic determination of the globular area transition current. The proposed embodiment thus enables adjustment of the short-circuiting percentage from a first larger value to a second smaller value when said desired welding current is increased to a value equal or greater than the globular area transition current, and adjustment of the short-circuiting percentage from a second smaller value to a first larger value when the desired welding current is decreased to a value equal or smaller than the globular area transition current.

The invention furthermore relates to a method of welding including the steps of automatically setting a welding parameter for MIG/MAG welding as defined above during a parameter setting welding operation followed by a continued welding process controlled by the welding parameter or welding parameters set during the parameter setting welding operation.

Optionally the invention relates to a method of welding where an operator selects a work piece thickness, and a welding controller automatically determining the desired welding current, the desired wire feed speed, the voltage reference value Uref, during the parameter setting welding operation, where after the operator and performs a continued welding operation with the desired welding current, the desired wire feed speed, and the voltage reference value Uref as control parameters. A wire welding material may automatically be detected from data collected by the welding controller.

BRIEF DESCRIPTION OF DRAWINGS

Embodiments of the invention will be described in further detail below with reference to the appended drawings, where FIG. 1 discloses schematically a device for MIG/MAG-welding, FIG. 2 discloses how the current and the voltage are changed when a droplet is transferred between the weld electrode and the workpiece during short arc welding, FIG. 3 schematically discloses an architecture of a welding controller arranged to perform a method according to the invention, FIG. 4 schematically shows a set of different first functions $\psi_1$, $\psi_2$, $\psi_3$, $\psi_4$ and a set of first data couples Q1, Q2, Q3.

EMBODIMENTS OF THE INVENTION

Figure 1:
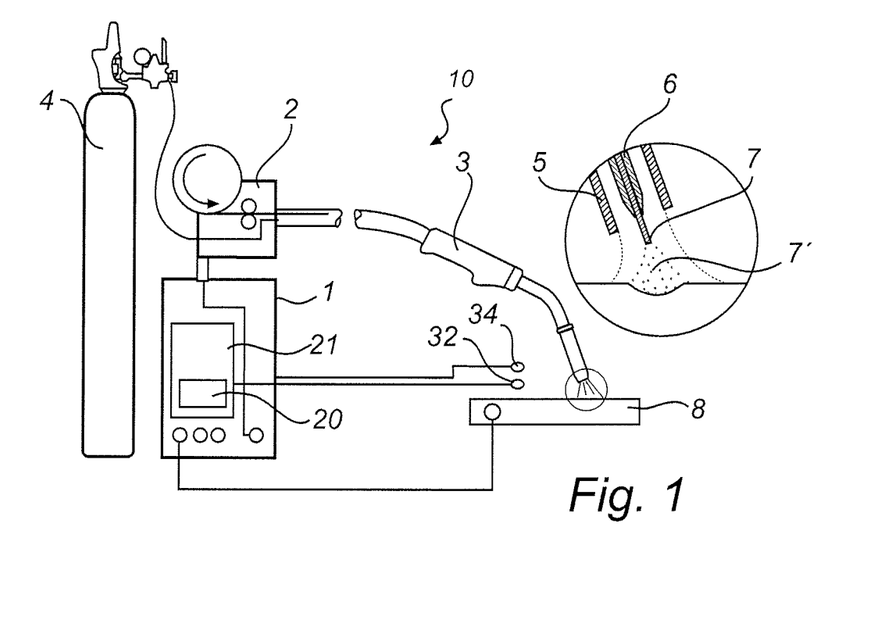

FIG. 1 discloses welding equipment for MIG/MAG welding. The welding equipment disclosed comprises a welding machine 10 having a power source 1 adapted to supply welding energy, or melting power, to the electrode 7. Preferably the power source 1 comprises an inverter power supply. An electrode feeder 2 is provided on the welding machine 10. The electrode feeder 2 is adapted to feed the electrode 7 to a welding torch 3. The welding torch 3 is connected to the electrode feeder 2, the welding machine 10 and a gas container 4 via a welding cable. The welding torch 3 comprises a gas cup 5 and a contact tube 6 through which the electrode 7 is fed to a position in the proximity of the workpiece 8. Welding gas is supplied from the gas container 4 to the space enclosed between the gas cup 5 and the contact tube 6.

Furthermore, the welding equipment comprises a welding controller 20. The welding controller 20 includes a general controller 21 which is arranged to control the welding current and voltage by setting appropriate static and dynamic characteristics for a work piece to be welded. The general controller 21 is furthermore arranged to regulate the feeding velocity of the electrode feeder 2. The general controller 21 specifically sets a reference voltage Uref which is used as a reference for an average voltage during the welding process. In addition to the conventional control functions for setting a reference voltage and defining the shapes of the welding current and welding voltage performed by the general controller 21, the welding controller 20 includes a set of control blocks to enable operation of the method of automatically setting a welding parameter for MIG/MAG welding according to the invention.

Figure 3:
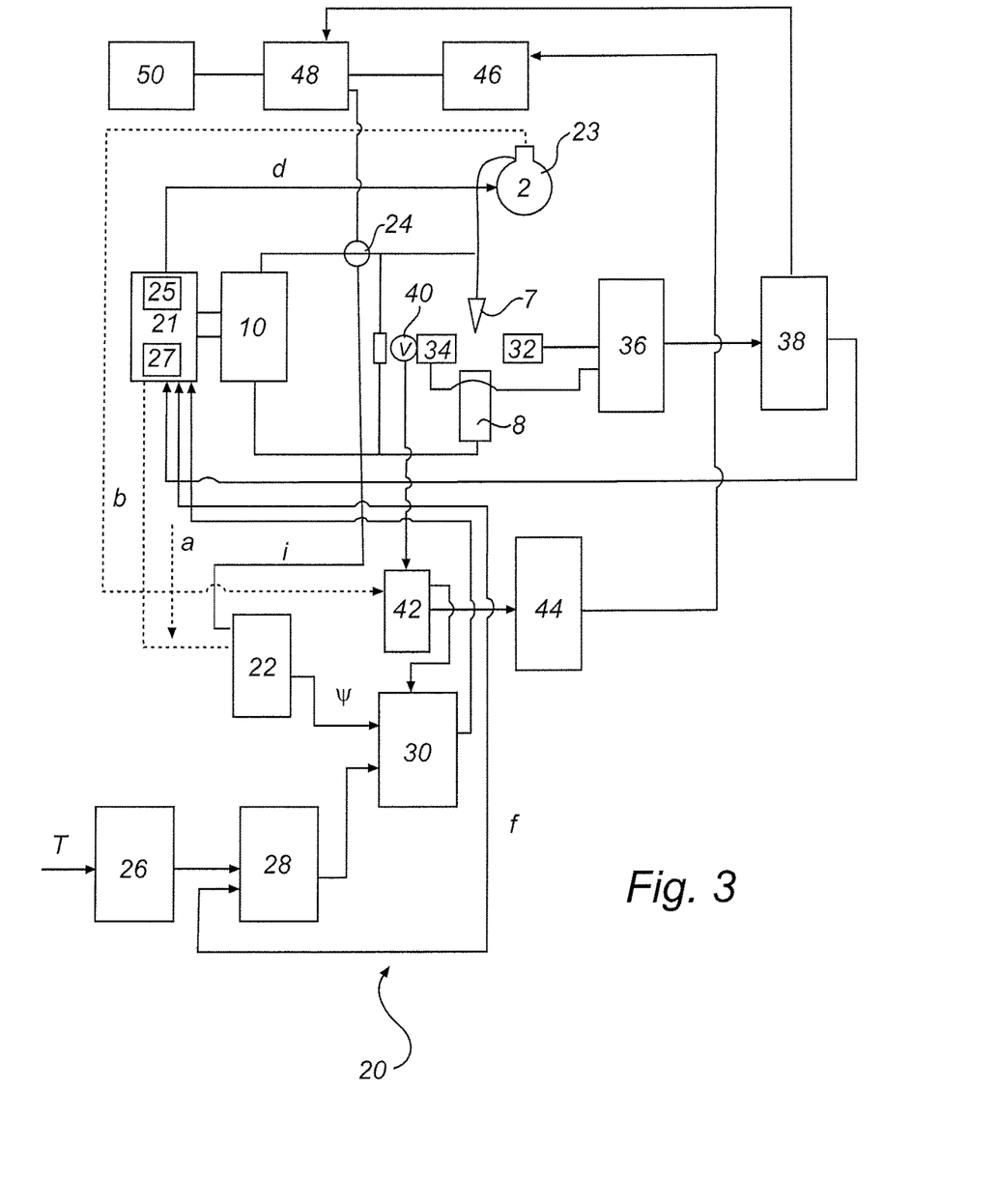

FIG. 3 schematically discloses an architecture of a welding controller 20 arranged to perform a method according to the invention. The welding controller 20 includes a first function determination control block 22. In the first function identification control block 22 a first function is identified from a detected response welding current $I_{detected}$ and a present wire feed speed v. The present wire feed speed may be collected from the general controller 21 via path a) or alternatively be detected by a sensor 23 sensing the wire feed speed. The response welding current $I_{detected}$ may be provided from the general controller 21, which is provided with a sensor 24 for sensing the welding current.

The present wire feed speed v and welding current I forms a first data couple or a first set of data couples depending on whether a single or a plurality of samples are made.

The first data couple defines an operating point in a welding current/wire feed speed space. A set of data couples defines a set of operating points in the welding current/wire feed speed space. Functions defining a relationship between welding current and wire feed speed between wires of different dimensions may be stored in a memory accessible by said first function identification control block. By identification of the operating point in the welding current/wire feed speed space, or by linear regression of the set of operating points, a first function LP which best represents a current welding operation may be selected.

Generally the first function $\psi$ forms a linear mapping from the response welding current to the present wire feed speed, that is $v=\psi(I)$.

Suitably the relationship between the welding current and the wire feed speed may be expressed as $v=k*I^p$, even though more or less complex functions may be contemplated. Here v is the wire feed speed, I is the welding current and p is a number between 1 and 2. This relationship may hold for a set of welding wires with different dimensions and of different materials. The appropriate first function $\psi$ for a specific material and dimension may depend on the values on k and p. With the detected response welding current and the current wire feed speed, the first parameter values k and p may be determined by a straightforward operation in the welding controller. In the event two parameter values are to be determined, at least two data couples v, I are needed. In a simple model, p may be known for a set of welding conditions that are applicable to the welder. Thus the first function $\psi$ may be identified from a single data couple.

The determination of the first function $\psi$ may be performed by interpolating in a look up table defining a relationship between the welding current I and the wire feed speed v, by using a function defining a relationship between the welding current I and the wire feed speed v and determining suitable coefficients for describing the function or by any other means for identifying an appropriate first function defining a relationship between the welding current I and the wire feed speed v.

Figure 4:
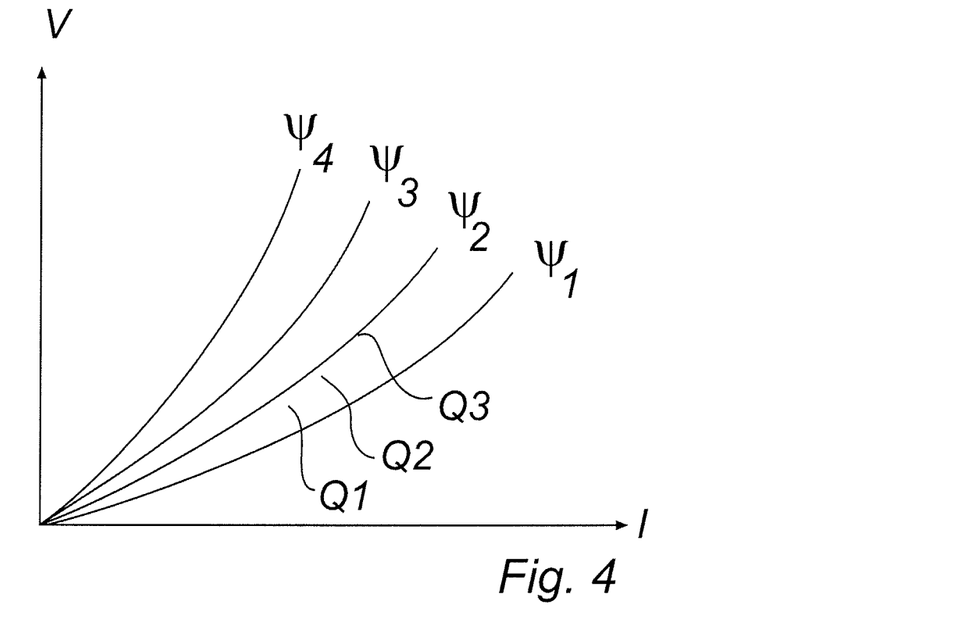

In FIG. 4 it is schematically shown a set of different first functions $\psi_1$, $\psi_2$, $\psi_3$, $\psi_4$ and a set of first data couples Q1, Q2, Q3 in a welding current/wire feed speed space. Data representing the different first functions may be stored in a memory area 25. By collecting the first data couples identification of which of the first functions best represents the data couples may be performed in a conventional manner.

For the purpose of determining the first function $\psi$, the first function determination control block 22 has access to the memory area 25 where the relationship is stored and to processor means 27 for performing the calculation. In an embodiment, the first function may be identified by establishing parameter values, for example k and p as defined above, describing the first function. The memory and processor means may be shared with other control blocks of the welding controller 20 or be locally arranged in the control block. Since the stored relationship may be described with sufficient accuracy as a simple linear function, a hard wired solution providing a measure of the first function may be used.

An operator may set an actual thickness of a work piece to be welded as an input data to the welding controller 20. The actual thickness T can be entered via an operator interface 26 by an operator.

The welding controller further includes a desired welding current control block 28 that determines a desired welding current from an inputted thickness. This may be performed by a desired welding current mapping function which maps a thickness of the work piece to a desired welding current. The desired welding current mapping function may be provided in the form of a look up table defining a relationship between the work piece thickness and the desired welding current, by using a function defining a relationship between the work piece thickness and the desired welding current or by any other means for defining a relationship between the work piece thickness and the desired welding current. The look up table and/or the function may be generated by collection of welding data in a conventional manner. A desired welding current is determined in the desired welding current control block 28 from said actual thickness T by use of the desired welding current mapping function.

Generally the desired welding current mapping function forms a linear mapping from the work piece thickness to the desired welding current. Suitably the relationship between the work piece thickness and the desired welding current may be expressed as $I=k_1*T+k_2*T^2$, even though more complex functions may be contemplated. Here I is the welding current and T is the thickness of the working piece.

For the purpose of determining the desired welding current $I_{desired}$, the desired welding current control block 28 has access to a memory area 25 where the desired welding current mapping function is stored and to processor means 27 for performing the calculation. The memory and processor means may be shared with other control blocks of the welding controller 20 or be locally arranged in the control block.

A wire feed speed control block 30 is provided to determine a desired wire feed speed $v_{desired}$ from the first function $\psi$ provided from first function determination control block 22 and the desired welding current $I_{desired}$ provided from the desired welding current control block 28. The determination may be performed by interpolating in a look up table defining a relationship between the welding current and the first function, by using a function defining a relationship between the welding current and the first function or by any other means defining a relationship between the welding current and the first function. In the event the first function $\psi$ is described by a set of parameters, which are determined in the first function identification control block, the desired welding current control block 28 will use the determined parameters to calculate the desired welding current.

For example, in the first function identification control block, k and p in the expression $v=k*I^p$ may be determined from the response welding current and present wire feed speed. Once k and p are determined the desired wire feed speed for a desired current may be determined.

For the purpose of determining the desired wire feed speed $v_{desired}$, the wire feed speed control block 30 has access to a memory area 25 where the relationship defining the first function is stored and to processor means 27 for performing the calculation. The memory and processor means may be shared with other control blocks of the welding controller 20 or be locally arranged in the control block. Since the stored relationship may be described with sufficient accuracy as a simple linear function, a hard wired solution providing a measure of the first function may be used.

The desired wire feed speed is forwarded to the general controller 21 via a communication channel c for control of the electrode feeder 2 via a communication channel d.

The welding controller 20 may optionally comprise a sensor 32, which is adapted to sense a short circuit between the electrode 7 and the workpiece 8, and a sensor 34, which is adapted to sense an arc between the electrode 7 and the workpiece 8. A short circuit percentage value determination control block 36 and the sensor 32 together form means for establishing a short-circuiting time, i.e. the duration of a short circuit. The short circuit percentage value determination control block 36 and the sensor 34 together form means for establishing an arc time, i.e. the duration of an arc. In the short circuit percentage value determination control block 36 a short circuit percentage value short % is determined in a straight forward manner. The short circuit percentage value short % is fed forward to a welding voltage reference value determination control block 38 at which a correctional term Δ for the reference voltage Uref is determined. The correctional term Δ for the reference voltage is fed forward via a communication channel e to the general controller 21 which adapts the reference voltage. The general controller 21 is thus adapted to control the energy supplied to the electrode 7 in such a way that the energy supply is increased if a measured short-circuiting time of a total period time, where the period time is the sum of the short-circuiting time and the arc time, exceeds a defined adjustable set value and decreases if said short-circuiting percentage goes below said set value. Consequently, the general controller 21 will maintain the short-circuiting percentage at a constant, desired set value.

An embodiment of the invention may be used for maintaining the short-circuiting percentage constant at a desired set value. This is achieved by letting the general controller 21 in a conventional way give the power source appropriate static and dynamic characteristics in order to generate a desired short circuiting percentage.

The embodiment may, however, as an alternative also be performed in more simple machines such as thyristor-controlled weld current sources without any particular process regulator. In this case the regulator of the embodiment controls directly the ignition angle for the thyristor of the welding machine 1.

Optionally a welding voltage is measured by a volt meter 40. A parameter representing a wire feed speed is determined either from a sensor 23 or via data retrievable from the general controller 21. A second function determination control block 42 is provided to identify a second function $\phi$. The second function determination control block 42 use the measured welding voltage and the parameter value representing the wire feed speed to determine the second function $\phi$ mapping a parameter representing a wire feed speed to a welding voltage, that is $U=\phi(v)$.

As have been previously indicated, the welding voltage and the parameter value representing the wire feed speed form a second data couple defining an operating point in a welding voltage/parameter representing the wire feed speed space. A set of data couples defines a set of operating points in the welding voltage/wire feed speed space. Functions defining a relationship between welding voltage and the parameter representing the wire feed speed between wires of different materials may be stored in a memory accessible by said second function identification control block.

Figure 5:
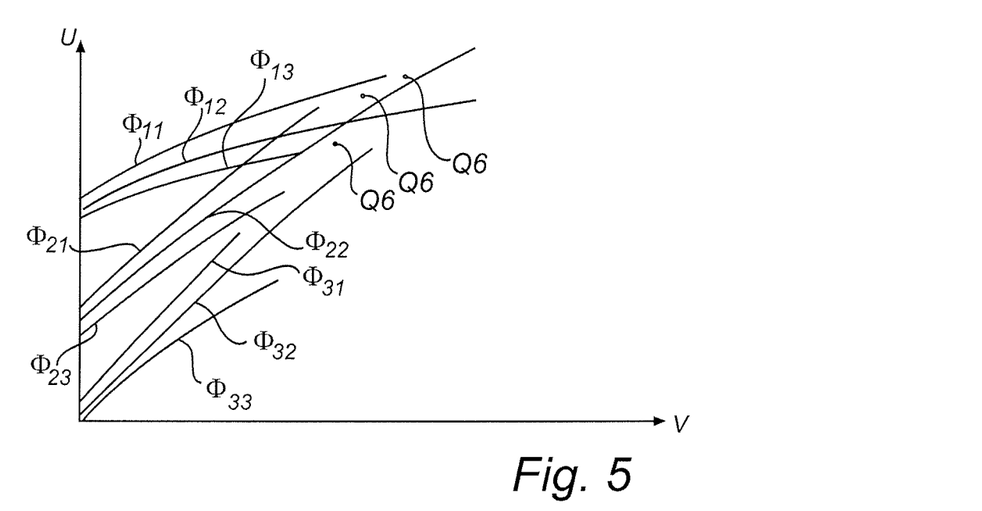
FIG. 5 schematically shows a set of second functions $\phi$ in a welding voltage/wire feed speed space.

FIG. 5 schematically shows a set of second functions $\phi$ in a welding voltage/wire feed speed space. The functions results from test performed by welding at different welding speeds with welding wires of different material and diameters. For each welding material a set of functions $\phi_{11}$, $\phi_{12}$, $\phi_{13}$ etc. grouped together typically represent different wire diameters. Different welding materials are represented by different groups of functions $\phi_{11}$, $\phi_{12}$, $\phi_{13}$; $\phi_{21}$, $\phi_{22}$, $\phi_{23}$, $\phi_{31}$, $\phi_{32}$, $\phi_{33}$ etc. Functions in different groups may cross each other in the welding voltage/wire feed speed space. By taking a suitable number of second data couples Q4, Q5, Q6, the second function $\phi$ corresponding to the material used can be identified. Instead of storing representations of the functions, a second function $\phi$ may be identified by adapting parameter values to an expression generally describing the functions. The expression may be a polynomial.

By identification of the operating point in the welding voltage/wire feed speed space, or by linear regression of the set of operating points, a second function which best represents a current welding operation may be identified. In one embodiment the material used is determined from data representing the welding voltage at zero wire feed speed. It has shown that different welding wire materials and different thicknesses of the welding wires are described with different functions in the welding voltage/parameter representing the wire feed speed space and that these functions are easily separable at zero or approximately zero wire feed speed. Hence, from the identification of a specific second function from the welding voltage and the parameter representing the wire feed speed a welding material can be determined. In any way the information may be used for determining a desired welding voltage for a specific welding wire material using the determined second function $U=\phi(v)$ to determine a suitable reference voltage for a desired wire feed speed.

With the parameter representing the wire feed speed and the welding voltage, the second function $\phi$ may be determined by a straightforward operation in the second function determination control block 42.

For the purpose of determining the second function $\phi$, the second function determination control block 42 has access to a memory area 25 where the relationship is stored and to processor means 27 for performing the calculation. The memory and processor means may be shared with other control blocks of the welding controller 20 or be locally arranged in the control block.

In one embodiment identification of which welding wire material is currently used may be done together with an automatic setting of the welding voltage by regulating the reference voltage with respect to the short arc percentage value. The combined method enables a welding machine to be operable for a large variety of weld electrode dimensions and materials.

Optionally the welding controller 20 may include welding wire determination control block 44 which automatically determines which welding wire material and wire dimension are presently used from the second parameter provided from the second function determination control block 42. This may be performed in a look up table which defines a material or a class of materials depending on the identified second function.

The welding controller may thus automatically determine which welding wire material is presently used from the identified second function in welding wire determination control block. This may be performed as suggested above by retrieving a value of a welding voltage at zero wire feed speed from the second function, by use of a look up table which defines a material or a class of materials depending on the value of the second function or by matching the second data couple or couples to a second function, which itself is representative of a specific material. Instead of actually determining which welding wire material is used, the output from the second function determination control block 42 may be used to generate a desired current correction parameter Icorr, which contains information for correction of the desired current generated in the desired welding current control block 28. Alternatively the output from the second function determination control block 42 may be an input to the desired welding current control block 28. Communication may take place via the communication channel f.

Furthermore a globular area transition current determination control block 46 may be provided. In the globular area transition current determination control block 46 a globular area transition current may be determined for welding from welding wire material and dimension. Once the welding wire material and welding wire dimension has been determined in the welding wire determination control block 44 from the second parameter a globular area transition current may be collected from a look up table. The globular area transition current is a current representative of a globular area at which the metal transfer mode shifts from short arc to spray arc or vice versa.

The possibility to control the welding process by controlling the reference voltage in dependence of a short arc percentage value enables stable welding at least partly into the spray area. In the colder part of the spray area, a small percentage of short-circuiting droplet transitions is still present. With an adjustment of 2-5% short-circuiting percentage, a stable control also of this part of the spray area, sometimes mentioned under the concept RapidArc, is obtained. During pure short arc welding, a suitable short-circuiting percentage is, however, 17-25%, and 21% has shown to be the most suitable as a start value. If a colder weld is desired, the percentage is increased and vice versa. An inputting device having this function to adjust the set value for the short-circuiting percentage should be present on the current source, electrode feeder or adjustment box.

An automatic detection of the welding wire material and welding wire dimension enables automatic determination of the globular area transition current. The proposed embodiment thus enables adjustment of the short-circuiting percentage from a first larger value to a second smaller value when said desired welding current is increased to a value equal or greater than the globular area transition current, and adjustment of the short-circuiting percentage from a second smaller value to a first larger value when the desired welding current is decreased to a value equal or smaller than the globular area transition current. The adjustment of the short-circuiting percentage from a first larger value to a second smaller value when said desired welding current is increased to a value equal or greater than the globular area transition current, and the adjustment of the short-circuiting percentage from a second smaller value to a first larger value when the desired welding current is decreased to a value equal or smaller than the globular area transition current is performed in a short circuit percentage adjustment control block 48, which sets an appropriate short circuiting percentage dependent on whether the welding device operates in the short circuit mode or in a low part of the spray mode. An operator input device 50 may adjust the set values for the short circuiting percentage.

Figure 6:
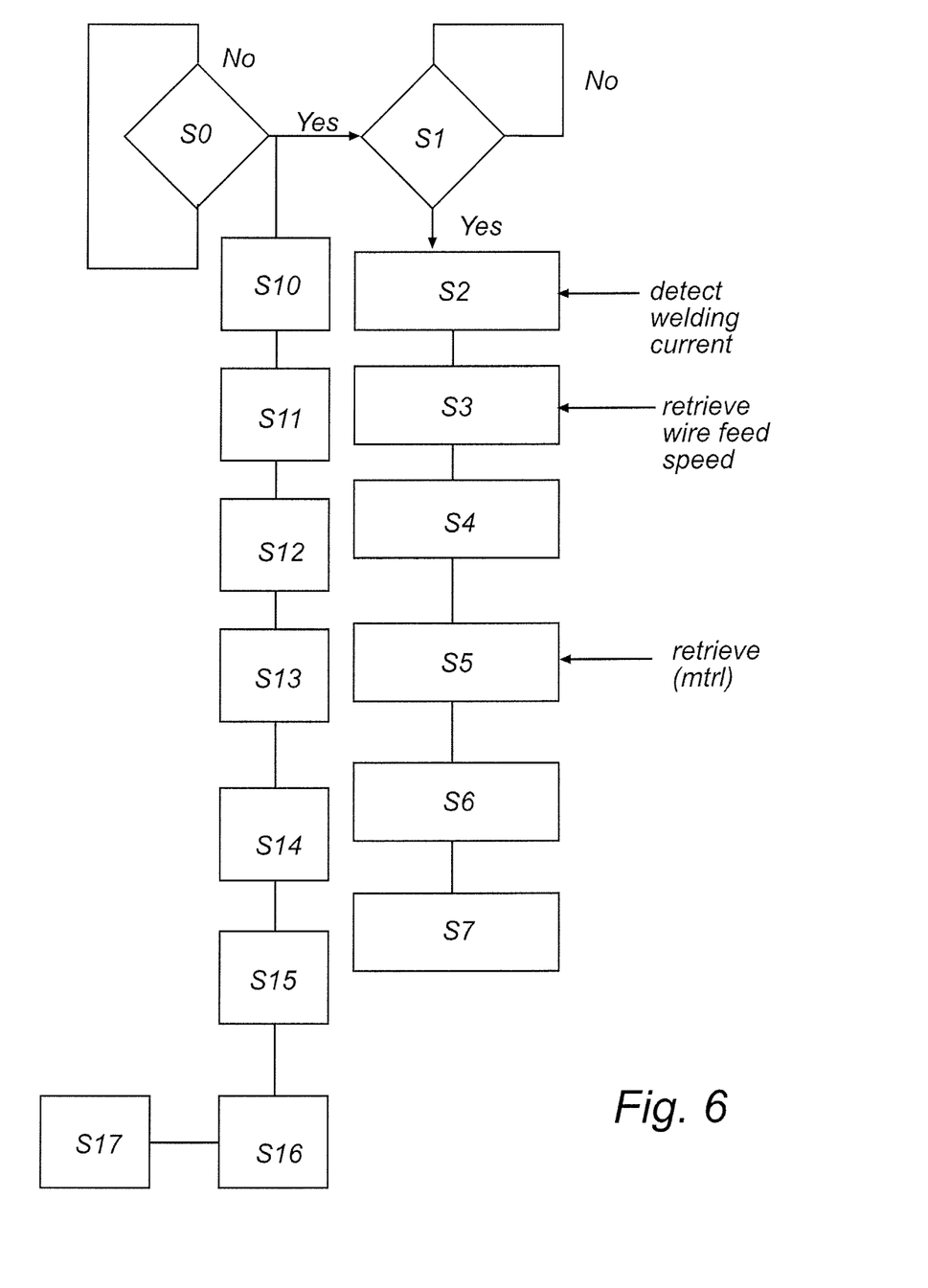
FIG. 6 shows a block scheme of a embodiments of methods according to the invention.

FIG. 6 shows a block diagram of embodiments of a method of welding including the steps of automatically setting a welding parameter for MIG/MAG welding during a parameter setting welding operation. The steps of automatically setting a welding parameter will be followed by a continued welding process controlled by the welding parameter or welding parameters set during the parameter setting welding operation.

Optionally, in a first step S0 a parameter setting welding operation comprises establishment of a short arc welding process defined by a short-circuiting time and an arc time. In the event the short arc welding process is in operation a short-circuit percentage value short % is calculated in a subsequent step S10. In a following step S11 the melting efficiency of the electrode is controlled in such a way that the melting efficiency is increased if a measured short-circuiting time of a total period time, where the period time is the sum of the short-circuiting time and the arc time, exceeds a defined adjustable set value and decreased if said short-circuiting percentage goes below said set value. The control may be accomplished by setting an appropriate reference voltage Uref.

In a step S1 a parameter setting welding operation is initiated. This may be initiated automatically by that an operator performs a welding process or by that the operator indicates via an operator input interface that a parameter setting operation should be initiated. Step S1 may optionally be preceded by step S0 and the automatic parameter setting processes defined by the blocks S2-S7 may run in parallel with the automatic parameter setting processes defined by the blocks S10-S17, possibly with exchange of information between the processes.

During the parameter setting welding operation a response welding current is detected in step S2. In step S3 a set wire feed speed is retrieved. In step S4 a first function $\psi$ mapping said response welding current to said set wire feed speed is identified. This may be done by identifying appropriate parameter values k and p, alternatively a function in a set of functions stored in a decoded format in a memory may be selected. The selection may be based by calculation a minimum deviation from a set of couples and each of the stored function. In step S5 an actual thickness of a work piece to be welded is retrieved from an operator interface. The operator may also input the wire material used in the process to the operator interface or automatically derive the wire material and optionally wire dimension from the parallel process of steps S10-S15.

In step S6 a desired welding current is determined from the set actual thickness of the work piece. In step S7 a desired wire feed speed is determined from the first function and the desired welding current.

Optionally the steps S10-S15 are performed in parallel with the process defined by steps S1-S7. The steps S16-S17 may also be performed in parallel with steps S1-S7. In step S12 a welding voltage is measured and in step S13 a parameter value representing the wire feed speed is measured. This parameter value may be the wire feed speed or the welding current. In step S14 a second function mapping said parameter value representing the wire feed speed to said welding voltage is determined from the measured welding voltage and parameter value representing the wire feed speed. In step S15 a welding wire material and optionally a wire dimension are determined from the second function. The information derived in step S15 defining the welding wire material and optionally wire dimension may be fed forward to step S6 for determination of a desired welding current.

Optionally, the method for automatically setting a welding parameter for MIG/MAG welding includes a step S16 where a globular area transition current is determined from information defining the wire welding material determined in step S15. In a step S17 the short-circuiting percentage is adjusted from a first larger value to a second smaller value when said desired welding current is increased to a value equal or greater than said globular area transition current, and the short-circuiting percentage is adjusted from a second smaller value to a first larger value when said desired welding current is decreased to a value equal or smaller than said globular area transition current.

Beneficially, during the parameter setting welding operation, the welding voltage, welding current and wire feed speed are recorded as data triplets from which a desired wire feed speed and a desired welding current are determined to be used in the continued welding operation by identification of the first and second functions in a manner as described above.

The invention claimed is:

1. A method of automatically setting a welding parameter of a welding apparatus for MIG/MAG welding including the following steps:
generating, by a welding controller of the welding apparatus during a parameter setting welding operation, a plurality of data couples, each data couple comprising a welding voltage and a wire feed speed parameter;
identifying, by the welding controller, a second function mapping a relationship between the welding voltage and the wire feed speed parameter based on the data couples, wherein the second function is defined outside of real welding operating points; and
determining, by the welding controller, a welding wire material category using the second function defined outside of the real welding operating points.

2. The method of claim 1, further comprising:
determining, by the welding controller, a controlling voltage based on wire welding material from said second function.

3. The method of claim 1, further comprising
determining, by the welding controller, a wire welding material from said second function using a lookup table.

4. The method of claim 3, wherein a desired welding current is determined from a set actual thickness of a work piece in dependence on said wire welding material determined from said second function.

5. The method of claim 3, further comprising determining, by the welding controller, a globular area transition current from said determined wire welding material.

6. The method of claim 5, further comprising decreasing, by the welding controller, a short-circuiting percentage when said desired welding current is increased to a value equal or greater than said globular area transition current, and increasing, by the welding controller, said short-circuiting percentage when said desired welding current is decreased to be equal to or smaller than said globular area transition current.

7. The method of claim 1, further comprising:
detecting, by the welding controller, a response welding current at a present wire feed speed during said parameter setting welding operation;
identifying, by the welding controller, a first function mapping a welding current to a wire feed speed from said response welding current and said present wire feed speed;
determining, by the welding controller, a desired welding current;
determining, by the welding controller, a desired wire feed speed from said first function and said desired welding current.

8. The method of claim 7, further comprising
setting, by an operator of the welding apparatus, an actual thickness of a work piece to be welded; and
determining, by the welding controller, said desired welding current from said set actual thickness of the work piece.

9. The method of claim 8, wherein said first function forms a linear mapping.

10. The method of claim 9, wherein said linear mapping is expressed as $v=k*I^p$, where v is the wire feed speed, I represents current and p is a value between 1 and 2.

11. The method of claim 7, wherein said parameter setting welding operation comprises establishment of a short arc welding process defined by a short-circuiting time and an arc time, and controlling a melting efficiency of an electrode so that the melting efficiency is modified based on a percentage value of a measured short-circuiting time of a period time.

12. The method of claim 11, further comprising determining, by the welding controller, a voltage reference value from said percentage value.

13. The method of claim 1 further comprising performing, by an operator of the welding apparatus, a continued welding process subsequent to the parameter setting welding operation.

14. The method of claim 13, comprising selecting, by the operator, a work piece thickness, automatically determining, by the welding controller, a desired welding current, a desired wire feed speed, and a voltage reference value from data collected during the parameter setting welding operation and performing, by the welding controller, the continued welding process with the desired welding current, the desired wire feed speed, and the voltage reference value as control parameters.

15. The method of claim 1, wherein the second function is defined based on welding at zero wire feed speed.

16. The method of claim 1, further comprising determining, by the welding controller, the welding wire material category using a value of the second function, the second function defined outside of the real welding operating points.

* * * * *